United States Patent
Kohiyama et al.

(10) Patent No.: US 12,393,806 B2
(45) Date of Patent: Aug. 19, 2025

(54) CODE GENERATION SYSTEM AND CODE GENERATION METHOD

(71) Applicant: Hitachi Industrial Equipment Systems Co., Ltd., Tokyo (JP)

(72) Inventors: Tomohisa Kohiyama, Tokyo (JP); Sadao Satou, Tokyo (JP); Atsushi Sagara, Tokyo (JP); Yoshiyasu Watanabe, Tokyo (JP); Hideaki Yokota, Tokyo (JP); Kazuaki Ikarashi, Tokyo (JP); Hiroyuki Kawasaki, Tokyo (JP); Katsunori Maeda, Tokyo (JP); Keigo Fujiwara, Tokyo (JP); Kazunobu Hisatsune, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/278,858

(22) PCT Filed: Feb. 25, 2022

(86) PCT No.: PCT/JP2022/008028
§ 371 (c)(1),
(2) Date: Aug. 25, 2023

(87) PCT Pub. No.: WO2022/181792
PCT Pub. Date: Sep. 1, 2022

(65) Prior Publication Data
US 2024/0143958 A1  May 2, 2024

(30) Foreign Application Priority Data
Feb. 26, 2021 (JP) .................. 2021-029671

(51) Int. Cl.
*G06K 7/14* (2006.01)
*G05B 19/418* (2006.01)

(52) U.S. Cl.
CPC ....... *G06K 7/1417* (2013.01); *G05B 19/4183* (2013.01); *G05B 2219/31304* (2013.01)

(58) Field of Classification Search
CPC .............. G06K 7/1417; G05B 19/4183; G05B 2219/31304; G06Q 10/06; G06Q 10/0875; G06Q 50/04; Y02P 90/30
See application file for complete search history.

(56) References Cited

U.S. PATENT DOCUMENTS

| 9,710,505 B1 | 7/2017 | McAlister et al. |
| 2012/0209824 A1 * | 8/2012 | Morimoto ............. G06F 16/958 707/705 |

(Continued)

FOREIGN PATENT DOCUMENTS

| JP | 2009-76055 A | 4/2009 |
| JP | 2012-168639 A | 9/2012 |

(Continued)

OTHER PUBLICATIONS

International Search Report (PCT/ISA/210) issued in PCT Application No. PCT/JP2022/008028 dated May 24, 2022 with English translation (4 pages).

(Continued)

*Primary Examiner* — Matthew Mikels
(74) *Attorney, Agent, or Firm* — Crowell & Moring LLP

(57) ABSTRACT

The present invention includes: an identification code generation unit that generates, from information of a company code including a first code that uniquely identifies a management target in a part of a company in the part of the company and a second code that identifies the part of the company, an identification code including a history of the management target; a hash processing unit that hashes the identification code generated by the identification code generation unit according to a hash function and converts the hashed identification code into a meaningless code; and a (Continued)

reference code generation unit that generates a reference code unified for the entire company based on the meaningless code converted by the hash processing unit.

19 Claims, 16 Drawing Sheets

(56) References Cited

U.S. PATENT DOCUMENTS

2019/0258230 A1   8/2019  Chiba et al.
2019/0258991 A1   8/2019  Nguyen et al.

FOREIGN PATENT DOCUMENTS

JP      2018-200598 A   12/2018
JP      2019-194920 A   11/2019

OTHER PUBLICATIONS

Japanese-language Written Opinion (PCT/ISA/237) issued in PCT Application No. PCT/JP2022/008028 dated May 24, 2022 with English translation (6 pages).
Extended European Search Report issued in European Application No. 22759826.5 dated Dec. 16, 2024 (8 pages).

* cited by examiner

FIG. 6

JSON OBJECT

101 ～ {"KEY NAME 1":"VALUE 1", "KEY NAME 2":"VALUE 2", ...."KEY NAME n":"VALUE n"}

102 ～ PID OF ASSEMBLY :
{
  "BUSINESS PLACE"        : "(N)"
  "FIGURE NO."            : "YYYY"
  "OFFICIAL PRODUCT NAME" : "XXXX"
  "WORKER"                : "SANKI Taro"
  "DATE AND TIME"         : "2020/05/14/13:341"
  "DNC OF PART 1"         : "DNC1"
  "DNC OF PART 2"         : "DNC2"
  ...
  "DNC OF PART n"         : "DNCn"
}

103 ～ PERFORMANCE-BASED DNC OF ASSEMBLY : H01234567...EFPP

100

JSON OBJECT

201 ~ {"KEY NAME 1":"VALUE 1", "KEY NAME 2":"VALUE 2", ....," KEY NAME n":"VALUE n"}

202 ~ PID OF PROCURED PRODUCT :

{
  "BUSINESS PLACE" : "(SK)(N)"
  "CLASSIFICATION CODE" : "VVVV"
  "FIGURE NO." : "WWWWW"    ⎫
  "OFFICIAL PRODUCT NAME" : "AAAA"   ⎬ REPEAT
  "CUSTOMER NAME" : "CUSTOMER 1"    ⎪
  "SUPPLIER" : "SUPPLIER 1"         ⎭
}

203 ~ PERFORMANCE-BASED DNC OF PROCURED PRODUCT : P01234567...EFPP

200

CODE GENERATION SYSTEM AND CODE GENERATION METHOD

TECHNICAL FIELD

The present invention relates to a code generation system and a code generation method for generating a code assigned to a product or the like.

BACKGROUND ART

For example, in the manufacturing industry, in order to enable all things from products to parts to be unifiedly identified and managed on a company-wide basis for promoting digital transformation (DX), there is a demand for a unified number system assigned to identify each thing. On the other hand, it takes a lot of investment and time to construct a new number system unified on a company-wide basis by abandoning an existing number system of products or parts operated for each production base such as a factory, and it is difficult to shift the number system. This is a problem that generally occurs at the time of integrating companies (or production bases) having different histories and backgrounds in M&A or the like.

In order to cope with such a problem, conventionally, an existing bill of material (BOM) code (see FIG. 5 of Patent Literature 1) is extended to construct a number system unified on a company-wide basis.

CITATION LIST

Patent Literature

[Patent Literature 1] JP 2019-194920

SUMMARY OF INVENTION

Technical Problem

However, the conventional technology has a problem that an existing code is complicated, and a number in a new number system should satisfy requirements such as ensuring uniqueness, meaningless coding, and ensuring a required number of digits, and due to this, a large cost is required for implementation.

The present invention has been made in consideration of the above problems, and an object thereof is to inexpensively construct a code system unified for an entire company based on a company code assigned to a management target in a part of the company.

Furthermore, in recent years, there has been a case where a record related to manufacturing or inspection of products or parts has been intentionally rewritten later and this has become a problem, and it is desirable to easily verify whether or not such a record has been altered. This is a second problem to be solved by the present invention. It is conceivable that subsequent rewriting of a record may be correction of an error and may be malicious rewriting. A second object of the present invention is to be able to generate a code that can easily detect occurrence of such rewriting regardless of whether the motivation is good or malicious and can confirm an original record.

Solution to Problem

In order to solve such a problem, the present invention includes: an identification code generation unit that generates an identification code including a history of a management target from information (a unique code identifying a target product or part, that is, the management target) of a company code including a first code (such as a product number) that uniquely identifies the management target in a part of the company in the part of the company and a second code (such as an identification number of a factory) that identifies the part of the company; a hash processing unit that inputs the identification code generated by the identification code generation unit into a hash function to hash the identification code, and converts the hashed identification code into a meaningless code; and a reference code generation unit that generates a reference code unified for the entire company based on the meaningless code converted by the hash processing unit.

Advantageous Effects of Invention

According to the present invention, it is possible to inexpensively construct a code system unified for an entire company based on a company code assigned to a management target in a part of the company. Further, when the company code for generating a unified code is rewritten later, rewriting can be easily detected.

BRIEF DESCRIPTION OF DRAWINGS

FIG. 6 is a diagram illustrating a JSON object that defines a PID used in the second embodiment.

DESCRIPTION OF EMBODIMENTS

Figure 1:
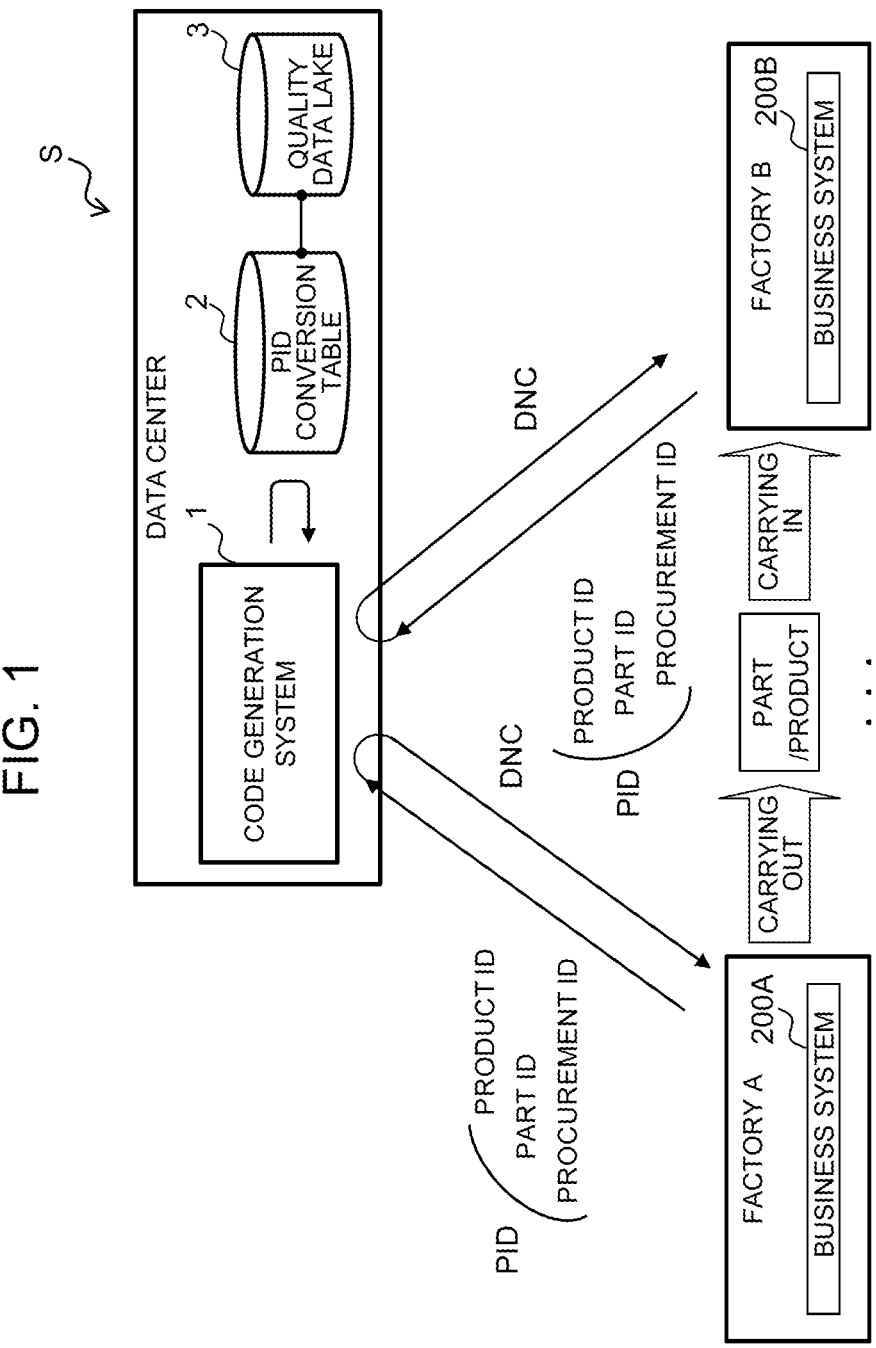
FIG. 1 is a diagram illustrating a schematic configuration of an entire system according to a first embodiment.

Hereinafter, embodiments of the present invention will be described with reference to the drawings. Some or all of embodiments and modifications can be combined within a scope of the technical idea of the present invention and within a scope consistent with each other.

Note that the embodiments described below do not limit the invention according to the claims, and all of elements described in the embodiments and combinations thereof are not necessarily essential to the solution of the invention. In addition, illustration and description of a configuration that is essential but well-known to configurations of the invention may be omitted.

In the drawings for describing the embodiments, the same reference numerals denote configurations or processes having the same or similar functions, and the following description will be omitted. In addition, for example, a plurality of elements of the same name with given reference numerals in which different branch numbers are added to the same number, such as "xxx100-1", "xxx100-2", "xxx100a", and "xxx100b", are collectively referred to as "xxx100" using only the same number.

First Embodiment

Hereinafter, a first embodiment of the present invention will be described with reference to FIGS. 1 to 4. As a premise of the first embodiment, it is assumed that there are a plurality of business places (for example, a factory producing parts or products, a development base, a management base, a business base, and the like) of a certain company.

In the first embodiment, an existing code for identifying a product in a code system for each factory used in a factory of a certain company is extended, and a unified code for uniquely identifying all products of the company in the entire company is formulated.

In addition, in the present embodiment, it is possible to unify management of product information and to cooperate with a quality assurance system by assigning a unified code to each shipment product of each factory while enabling continuous operation of an existing code in each factory. In addition, the product life cycle management (management of part information, production information, sales information, maintenance information, and the like) is realized by recording products and parts in association with all events related to the products or the parts using the unified code. Note that a target product/part of the unified code may be a product or a part that is managed on a lot-by-lot basis, in addition to a product or a part that is managed on an individual basis.

Entire System S of First Embodiment

FIG. 1 is a diagram illustrating a schematic configuration of an entire system S according to a first embodiment. In FIG. 1, the entire system S includes a code generation system 1, a PID conversion table 2, a quality data lake 3, and a plurality of business systems 200. The code generation system 1, the PID (Product/Parts/Procurement ID) conversion table 2, and the quality data lake 3 are disposed in a data center (including server rooms in a company, data centers inside and outside the company, cloud services, and the like). The business system 200 is a production management system, a quality assurance system, a shipment management system, a maintenance system, or the like. Each business system 200 is disposed in each factory. In the example of FIG. 1, a business system 200A is disposed in a factory A, and a business system 200B is disposed in a factory B.

The business system 200 and the code generation system 1 are connected via a communication network. For example, in the factory A, an identification (ID) such as a product ID for uniquely identifying a product in the factory A, a part ID for uniquely identifying a part in the factory A, and a procurement ID for uniquely identifying a procured product in the factory A is used as an ID having each existing code system. At this time, the product, the part, or the procured product can be managed as a management target of a company. The business system 200A transmits the ID of the existing code system to the code generation system 1 according to an instruction of an operator. The ID transmitted to the code generation system 1 may be one type of ID or a combination of a plurality of types of IDs.

The code generation system 1 generates a PID in which a code (factory code) for identifying a business place (factory) has been added to the ID received from the business system 200A, and generates a digital name code (DNC) from the PID. For example, the code generation system 1 can generate a PID as an identification code including a history of a management target from information of a company code including a first code (product number) for uniquely identifying a management target in a part (factory) of a company in the part of the company and a second code (factory code) for identifying the part of the company.

Here, in a case where the management target is a product, the company code is a product number (first code) of the product and a factory code (second code) of a factory that has manufactured the product, in a case where the management target is a part, the company code is a manufacturing number (first code) of the part and a factory code (second code) of a factory that has manufactured the part, and in a case where the management target is a procured product, the company code is a procured product number (first code) that identifies the procured product and a factory code (second code) of a factory that has procured the procured product. In addition, the DNC is a reference code as a unified code that uniquely identifies a product or a part in an entire company, which is unique in the entire company across a plurality of factories belonging to the company. The generated DNC is encoded into a code image of a two-dimensional code, and the encoded code image is pasted (or printed) on a corresponding product or part with a seal, a label, or the like. Information regarding the DNC read by scanning the code image pasted on the product or part is used as information for uniquely identifying the product or part in the entire company.

When the DNC is issued, the code generation system 1 generates a record in which the DNC has been associated with the PID to be the generation source of the DNC, and stores the record in the PID conversion table 2. The PID conversion table 2 is managed as a database, and is referred to at the time of performing reverse lookup of the PID from the DNC.

The above processing is performed between the business system 200B in the factory B and the code generation system 1, similarly to the business system 200A.

Here, a case where a part produced in the factory A is carried into the factory B, and a product is manufactured using the part in the factory B is considered. In the factory B, according to an instruction of the operator, the code image pasted on the part is scanned and the DNC is read, and the read DNC is transmitted from the factory B to the quality data lake 3. The quality data lake 3 is managed in cooperation with the PID conversion table 2, and manufacturing/quality data of the part or the product associated with the PID and the DNC is stored in the quality data lake 3. At this time, the quality data lake 3 stores manufacturing/quality data associated with the DNC received from the factory B, which is data acquired from the factory B.

In a case where there is an inquiry about manufacturing/quality data of the part or the product by the DNC for the quality data lake 3, the inquiry destination can acquire target manufacturing/quality data from the data lake 3.

By using the DNC capable of unifiedly identifying products or parts on a company-wide basis as described above, it is possible to unifiedly manage products or parts distributed between business places in the entire company while suppressing the cost burden on the companies or the business places, and to improve the traceability of the products or the parts. The improvement in the traceability improves customer satisfaction by enabling quick response at the time of failure occurrence. In addition, by using the DNC at the time of failure occurrence, it is possible to quickly identify a cause and grasp an influence range, and it is possible to minimize spoilage expenses. In addition, by applying to procured products procured from the outside by the company or the business place, it is possible to integrate suppliers of the procured products and reduce the cost such as purchase. In addition, by outputting or reading the DNC using the code image, it is possible to reduce labor and mistakes of a person at the time of code reading.

Configuration of Code Generation System 1 of First Embodiment

Figure 2:
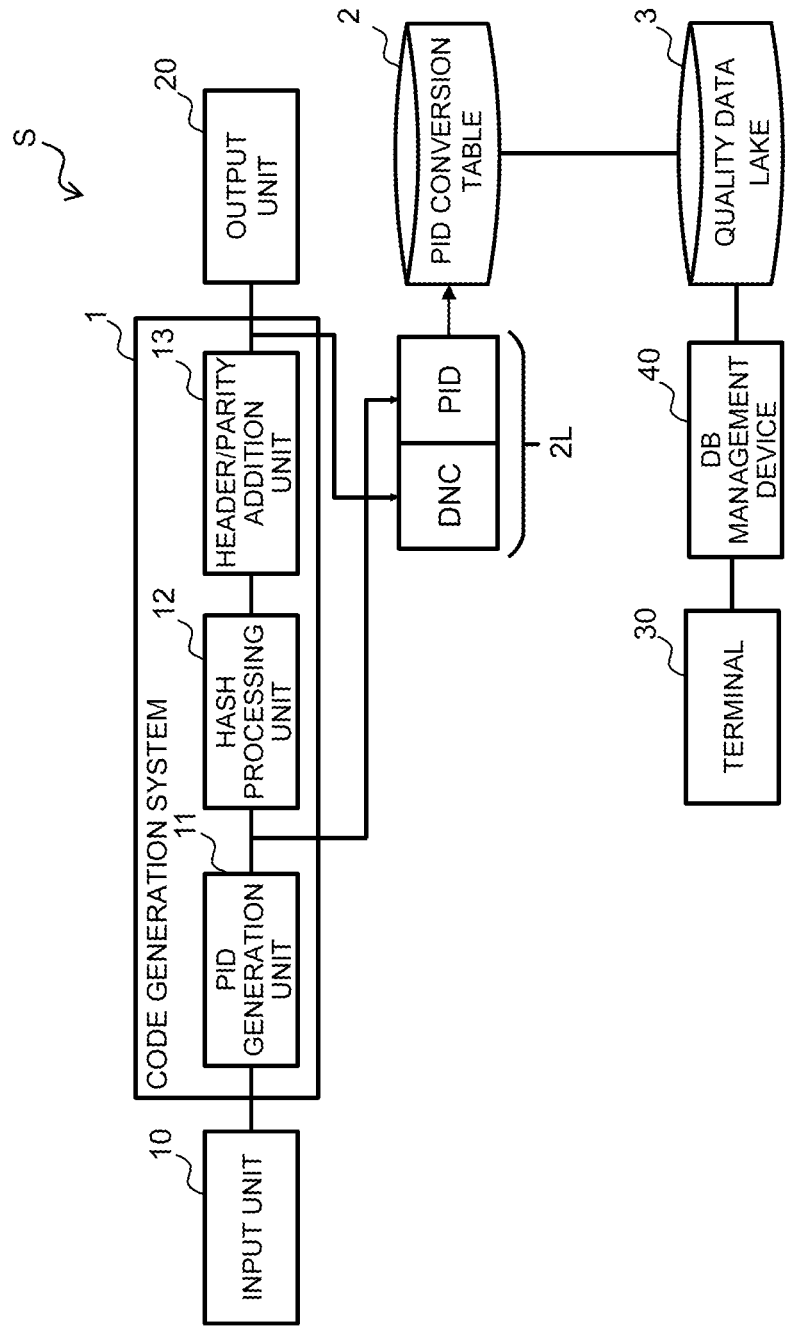
FIG. 2 is a diagram illustrating a configuration of a code generation system according to the first embodiment.

FIG. 2 is a diagram illustrating a configuration of the code generation system 1 according to the first embodiment. An input unit 10 that receives input such as a PID to be a DNC generation source code or an instruction of an operator, and an output unit 20 that outputs the DNC generated by the code generation system 1 are connected to the code generation system 1. The input unit 10 and the output unit 20 may be a console of the code generation system 1 or a terminal connected to the code generation system 1 via a network.

The code generation system 1 has a PID generation unit 11, a hash processing unit 12, and a header/parity addition unit 13. The PID generation unit 11 generates a PID in which a code (factory code) for identifying each factory has been added to the code (product number) of the existing code system unique in each factory input from the input unit 10. At this time, the PID generation unit 11 functions as an identification code generation unit that generates, from information of a company code including a first code (product number) for uniquely identifying a management target (for example, a product) in a part (factory) of a company in the part of the company and a second code (factory code) for identifying the part of the company, an identification code including a history of the product. Note that, as the PID, (1) a single current code used in each factory, (2) a plurality of current codes used in each factory, (3) a code obtained by mixing another code used in each factory and the current code, (4) a code indicating one or more DNCs constituting a target object of the PID, and (5) a code in which any of the above codes is expressed in a JavaScript Object Notation (JSON) format can be used. In particular, in the JSON format described as an example, it is possible to easily describe a record in which a plurality of parts are combined and a quality record (for example, a used inspection device, a value of an inspection result, a worker, a date and time, and the like). Here, the JSON format is taken as an example, and data in a format that can be handled by other NOSQL and RDB may be used. As described above, the PID may be a single code, a set of a plurality of codes, or a document in the JSON format. In the present specification, these are expressed as PIDs without distinction.

The hash processing unit 12 generates a meaningless code by hashing the PID generated by the PID generation unit 11 using a predetermined hash function. At this time, the hash processing unit 12 functions as a hash processing unit (hashing unit) that inputs the PID (identification code) generated by the PID generation unit (identification code generation unit) 11 to the hash function to hash the PID, and converts the hashed PID (identification code) into a meaningless code. The hash processing unit 12 performs hash function processing on the PID, maps the PID to a code space of a predetermined number of digits, causes the number of digits of the output code to be the same, and generates a new meaningless code. The hash function has a characteristic that it cannot be inversely transformed by a one-way function. Furthermore, if a value of the PID is different even by one bit due to the characteristic of the hash function, a hash value obtained by hashing the PID is completely different.

The header/parity addition unit 13 adds a management code including a header and a parity defined in the specification to the meaningless code generated by the hash processing unit 12, and generates a DNC indicating a code having a constant length. At this time, the header/parity addition unit 13 functions as a reference code generation unit that generates a DNC (reference code) unified for the entire company based on the meaningless code converted by the hash processing unit 12. In addition, the header/parity addition unit 13 stores a record 2L in which the PID generated by the PID generation unit 11 is associated with the generated DNC in the PID conversion table 2. Note that it is not necessary to attach a parity, that is, a check code to the meaningless code (hash value), but by attaching one or more digits of parity to the meaningless code, it is possible to detect erroneous reading of the hash value caused by partial damage of the two-dimensional code due to scratching or contamination of a print surface. In general, there is a case where an inspection pattern due to redundancy of information is embedded in the two-dimensional code, as an additional function of the two-dimensional code. However, there is a case where content of the code is also written in text characters separately from an image of the two-dimensional code, as a last backup mechanism when a predetermined area of the two-dimensional code is damaged. In this case, since there is no method of checking correctness of a character string without the check code, it is desirable to add the check code.

Note that, although the parity is described as a representative example of the check code here, a check code other than the parity may be used. As the header, one-character information is used as the standard. The characteristics of the DNC set can be indicated by adding the header of one character to the meaningless code (hash value). Here, the presence or absence of the header (header character) and the number of characters in the header may be arbitrary, and this is not the essence of the present invention.

As the PID conversion table 2, a NOSQL (Not Only SQL) type database can be used. For example, (1) in a case of a PID in one-to-one correspondence for a key (DNC), a key-value store type is used. (2) In a case of a PID having a plurality of columns including blanks for a key, a column-oriented type is used. (3) In a case of a PID having a document structure such as JSON for a key, a documentoriented type is used. (4) In addition to these NOSQL types, a relational database (RDB) of a conventional SQL type is applied.

As illustrated in FIG. 2, the quality data lake 3 is a database managed by a DB management device 40, and the quality data lake 3 stores manufacturing/quality data managed in a factory and information similar to the PID conversion table 2 (information of the record 2L in which the PID and the DNC are associated with each other). A terminal 30 transmits the information of the DNC obtained by a reading device reading the code image pasted on the product by the operator's operation to the DB management device 40 via the network. The DB management device 40 transmits and receives information to and from the terminal 30, functions as a search unit that sets the quality data lake 3 as a search target in response to a request from the terminal 30, and transmits a search result to the terminal 30.

Schematic Configuration of Code Generation System 1 of First Embodiment

Figure 3:
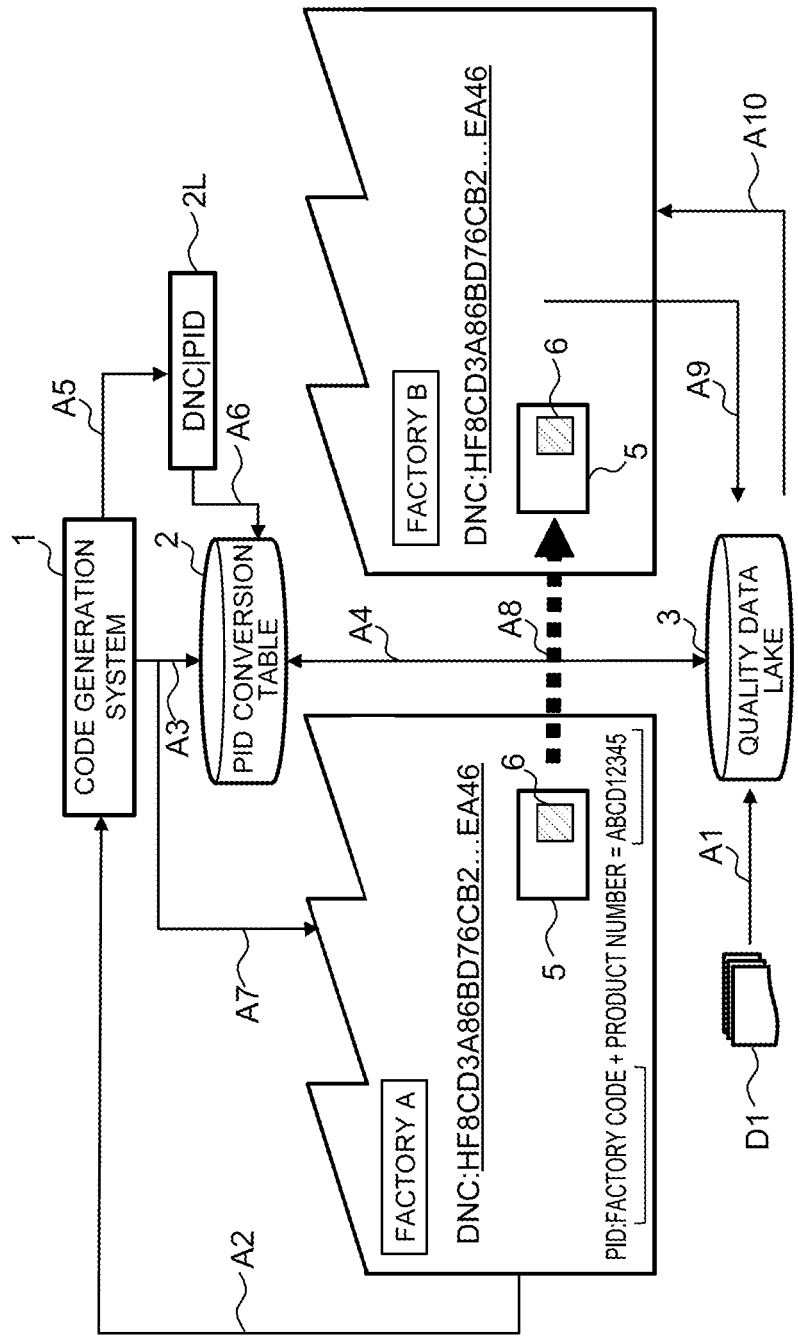
FIG. 3 is a diagram illustrating an outline of processing of the code generation system according to the first embodiment.

FIG. 3 is a diagram illustrating an outline of processing of the code generation system according to the first embodiment. In FIG. 3, in a factory A (industrial system 200A), before carrying out a produced product 5, a product number=ABCD12345, which is a code defined in the factory A as the product 5 and is a code of an existing code system unique in the factory A, is stored as manufacturing/quality data D1 in the quality data lake 3 via the terminal 30 and the DB management device 40 (A1). Thereafter, in the factory A (industrial system 200A), information including the product number=ABCD12345, which is the code unique in the factory A, and the factory code unique to the factory A, which is a factory code unique in the entire company, is transmitted to the code generation system 1 as information of the existing code system (A2). The code generation system 1 generates a PID from the received information, that is, the product number=ABCD12345 which is the code defined in the factory A and the factory code unique to the factory A, and hashes the generated PID using a predetermined hash function to generate a new meaningless code. Thereafter, the code generation system 1 generates a DNC in which a header and a parity defined in the specification have been added to the generated meaningless code.

At this time, the code generation system 1 refers to the PID conversion table 2 or the quality data lake 3 based on the generated DNC (A3 and A4), compares the generated DNC with the existing DNC recorded in the PID conversion table 2 or the quality data lake 3, and determines whether or not the generated DNC is unique in the entire system S. When the generated DNC is not matched with the existing DNC and is unique in the entire system S, the code generation system 1 generates a record 2L in which the generated DNC and the generated PID have been associated with each other (A5), and records the generated record 2L in the PID conversion table 2 (A6). Thereafter, the code generation system 1 converts the generated DNC into a two-dimensional code, generates a code image from the two-dimensional code, and transmits information of the generated code image to the factory A (industrial system 200A) (A7). In the factory A (industrial system 200A), when the information of the code image is received, the code image 6 is pasted or printed on the product 5 based on the received information of the code image.

On the other hand, when the product 5 is carried out from the factory A and the product 5 is carried into the factory B (A8), in the factory B (industrial system 200B), a two-dimensional code reader can read the information of the code image 6 pasted or printed on the product 5 to determine the DNC corresponding to the product 5. At this time, in the factory B (industrial system 200B), content of the DNC corresponding to the product 5 obtained by reading the information of the code image 6 can be inquired of the quality data lake 3 via the DB management device 40 (A9). At this time, the DB management device 40 can trace back the inquiry content to the factory B (industrial system 200B) based on the manufacturing/quality data D1 associated with the product number=ABCD12345 unique to the factory A (A10). That is, since the same information as the PID conversion table 2 (information in which the PID and the DNC have been associated with each other) is recorded in the quality data lake 3, information indicating whether the product 5 carried into the factory B is a product produced in the factory A and the product number is a correct number is transmitted from the DB management device 40 to the factory B (industrial system 200B).

Processing of Code Generation System 1 of First Embodiment

Figure 4:
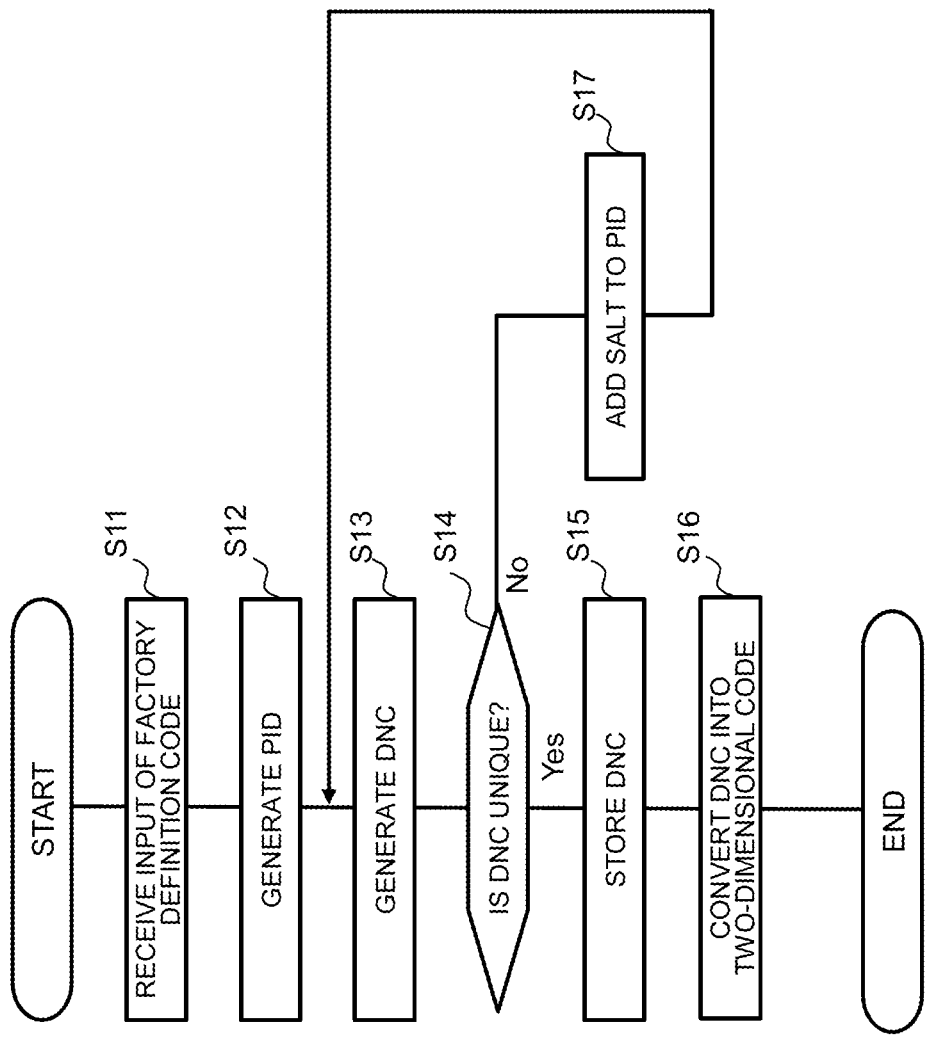
FIG. 4 is a flowchart illustrating processing of the code generation system according to the first embodiment.

FIG. 4 is a flowchart illustrating processing of the code generation system according to the first embodiment. In FIG. 4, in the code generation system 1, the PID generation unit 11 receives input of a factory definition code as information regarding a product from the input unit 10 (S11). For example, the PID generation unit 11 receives the product number=ABCD12345 as the A factory definition code. Thereafter, the PID generation unit 11 adds a code (factory code) for identifying the factory A to the A factory definition code to generate a PID, and outputs the generated PID to the hash processing unit 12 (S12).

The hash processing unit 12 hashes the PID generated by the PID generation unit 11 using a predetermined hash function to generate a new meaningless code, and outputs the generated meaningless code to the header/parity addition unit 13.

The header/parity addition unit 13 generates a DNC obtained by adding a header and a parity defined in the specification to the meaningless code generated by the hash processing unit 12 (S13), compares the generated DNC with the existing DNC recorded in the PID conversion table 2 with reference to the PID conversion table 2 based on the generated DNC, and determines whether or not the generated DNC is unique in the entire system S (S14).

When an affirmative determination result is obtained in step S14, that is, when the generated DNC is not matched with the existing DNC and is unique in the entire system S, the header/parity addition unit 13 executes processing of storing the generated DNC in the PID conversion table 2 (S15). For example, the header/parity addition unit 13 generates a record 2L in which the PID generated in step S12 and the DNC generated in step S13 have been associated with each other, and records the generated record 2L in the PID conversion table 2. As a result, an accurate DNC having uniqueness can be recorded in the PID conversion table 2 in association with the PID.

Thereafter, the header/parity addition unit 13 converts the DNC generated in step S13 into a two-dimensional code, generates a code image from the two-dimensional code, transmits information of the generated code image to the industrial system 200A of the factory A, and ends the processing in this routine.

On the other hand, when a negative determination result is obtained in step S14, that is, when the generated DNC is matched with the existing DNC and hashing collision occurs, the header/parity addition unit 13 adds salt (an addition code of a predetermined number of bits for changing the output hash value) as a correction value to the PID generated in step S12 (S17), and proceeds to the processing of step S13. At this time, in step S13, the header/parity addition unit 13 generates a new DNC based on a value obtained by adding the salt to the PID generated in step S12. As a result, even if the hashing collision occurs, the DNC having uniqueness can be generated again by adding the salt to the PID. Thereafter, the header/parity addition unit 13 executes the processing of steps S14 to S17.

According to the first embodiment, it is possible to inexpensively construct a code system unified for the entire company based on a company code assigned to a management target in a part of the company. That is, the existing code can be extended to inexpensively construct a number system unified on a company-wide basis. At this time, the factory can use the current code without changing the existing current code (product number or factory code). In addition, even if there is a different number system for each factory as the current code, it is possible to perform management in each factory using a DNC which is a code having the same number of digits across the factories. Furthermore, since the DNC is generated as a "meaningless code" by the hash function, internal information of the company is not leaked even if the DNC is disclosed to the outside of the company. This is due to the calculation difficulty of the hash function. In addition, when the DNC is generated using the hash function, there is no need for key management and no risk of key leakage, unlike when the code is concealed by encryption. In addition, when products are managed using the DNC, the cost required for DX can be suppressed, and an improvement effect can be obtained in a short period of time.

Second Embodiment

Hereinafter, a second embodiment of the present invention will be described with reference to FIGS. 5 to 7. Note that a configuration of an entire system S in the second embodiment is similar to that in the first embodiment.

Processing of Code Generation System 1 of Second Embodiment

Figure 5:
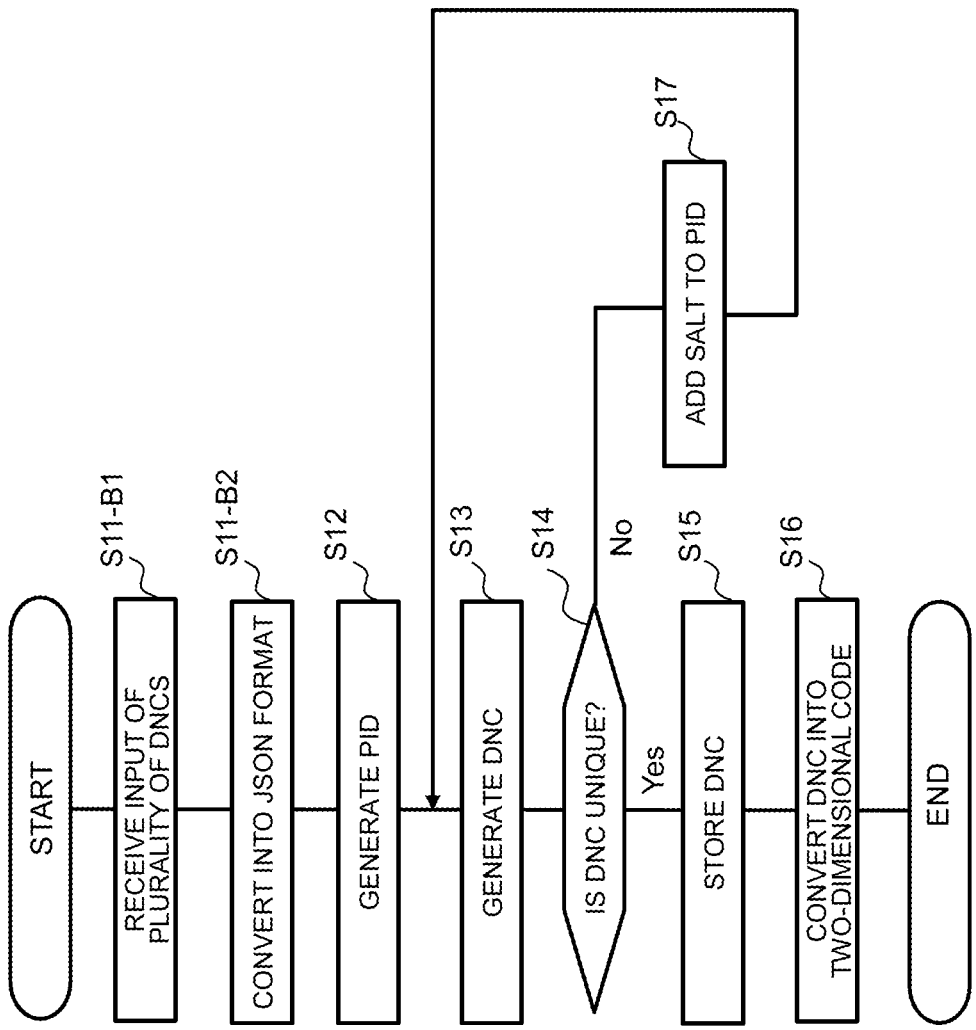
FIG. 5 is a flowchart illustrating processing of a code generation system according to a second embodiment.

FIG. 5 is a flowchart illustrating processing of a code generation system according to the second embodiment. In FIG. 5, in a code generation system 1, a PID generation unit 11 receives input of information such as a DNC added to each part as information regarding an assembly (product) including a plurality of parts from an input unit 10 (S11-B1). Thereafter, the PID generation unit 11 converts the received information into information in a JSON format (S11-B2), generates a PID of the assembly (product) based on the converted information (see FIG. 6), and outputs the generated PID to a hash processing unit 12 (S12).

The hash processing unit 12 hashes the PID generated by the PID generation unit 11 using a predetermined hash function to generate a new meaningless code, and outputs the generated meaningless code to the header/parity addition unit 13. Thereafter, the header/parity addition unit 13 executes processing of steps S13 to S17 similarly to processing of steps S13 to S17 illustrated in FIG. 4.

Configuration of JSON Object 100 of Second Embodiment

FIG. 6 is a diagram illustrating a JSON object that defines the PID used in the second embodiment. In FIG. 6, a JSON object 100 includes a format 101, an assembly PID 102, and an assembly performance-based DNC 103. As a format used when the PID of the assembly (product) is recorded, each element including "key name": "value" is recorded in the format 101. In addition, in the assembly PID 102, information when information such as a DNC added to each part is converted into a JSON format is recorded. For example, "business place": "(N)", "figure No. product No": "YYYY", "official product name": "XXXX", "worker": "SANKI Taro", "date and time": "2020/05/14/13: 34", "DNC of part 1": "DNC1", "DNC of part 2": "DNC2", . . . , and "DNC of part n": "DNCn" are recorded as the information of the assembly PID 102.

Information of the DNC generated by the header/parity addition unit 13 based on the information of the assembly (product) PID 102 is recorded in the assembly performance-based DNC 103. Note that the information recorded in the JSON object 100 is recorded in a quality data lake 3.

Processing of Code Generation System 1 of Second Embodiment

Figure 7:
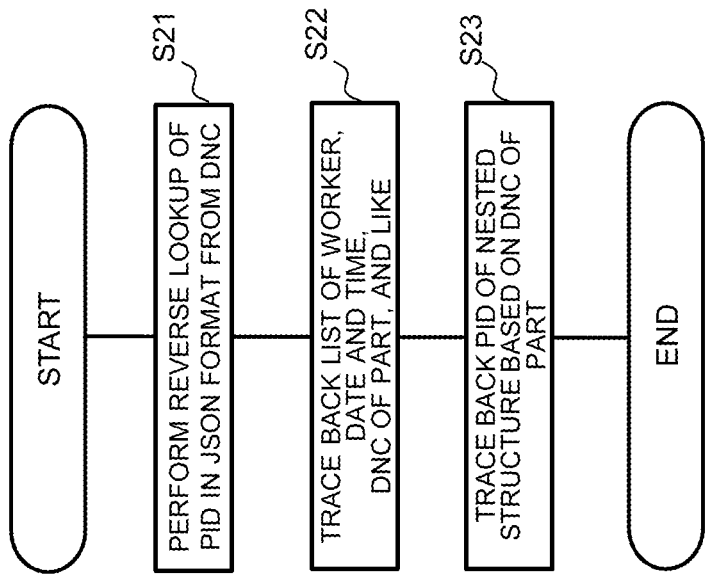
FIG. 7 is a flowchart illustrating processing of performing reverse lookup of a PID from a DNC in the second embodiment.

FIG. 7 is a flowchart illustrating processing of performing reverse lookup of a PID from a DNC in the second embodiment. In FIG. 7, in a case where an operator instructs a terminal 30 to perform the processing of performing reverse lookup of the PID from the DNC, in response to the instruction of the operator, the terminal 30 scans a code image pasted on the assembly (product) to read the DNC, transfers the information of the read DNC to a DB management device 40, and requests the DB management device 40 to perform the processing of performing reverse lookup of the PID from the DNC, so that the processing in this routine is started. In response to the request from the terminal 30, the DB management device 40 performs processing of performing reverse lookup of the PID in the JSON format from the DNC based on the information of the DNC transferred from the terminal 30 (S21). For example, the DB management device 40 searches the information of the JSON object 100 recorded in the quality data lake 3 based on the information of the DNC transferred from the terminal 30, and traces back, for example, the information recorded in the assembly PID 102 to the terminal 30 as information including a list of the worker, the date and time, the DNC of the part, and the like (S22). At this time, the DB management device 40 traces back the PID of a nested structure to the terminal 30 as a search result based on the information of the DNC of the part among the information recorded in the assembly PID 102 (S23), and ends the processing in this routine.

According to the second embodiment, a new DNC different from that of the first embodiment can be generated as a DNC of a nested structure based on a plurality of DNCs (a set of DNCs) added to a plurality of parts, and the generated DNC can be used as a DNC of an assembly (product). In addition, by pasting or printing the generated DNC on the assembly (product), when and which parts are used to assemble the assembly (product) is recorded. Furthermore, by performing reverse lookup of the PID from the DNC, it is possible to search a history of each part constituting the assembly.

Third Embodiment

Hereinafter, a third embodiment of the present invention will be described with reference to FIGS. 8 to 10. Note that a configuration of an entire system S in the third embodiment is similar to that in the first embodiment.

Processing of Code Generation System 1 of Third Embodiment

Figure 8:
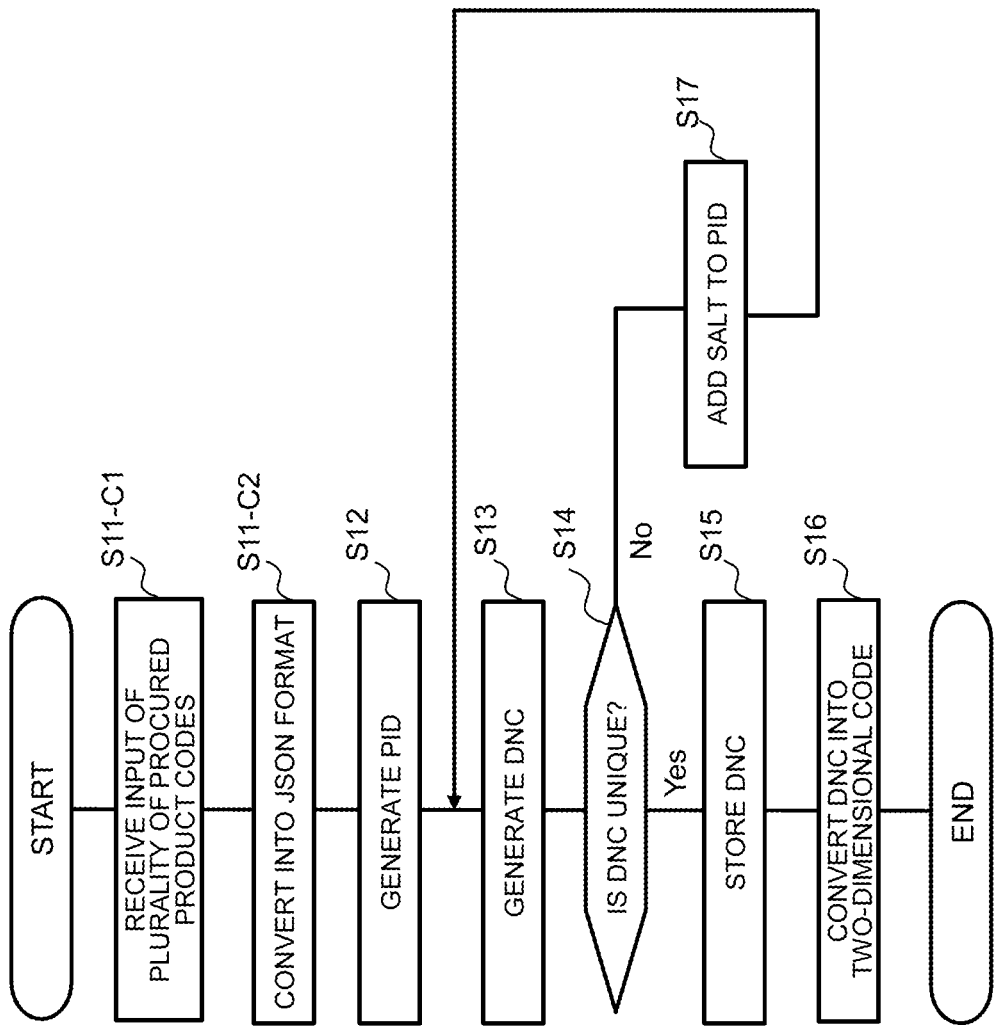
FIG. 8 is a flowchart illustrating processing of a code generation system according to a third embodiment.

FIG. 8 is a flowchart illustrating processing of a code generation system according to the third embodiment. In FIG. 8, in a code generation system 1, a PID generation unit 11 receives, from an input unit 10, input of information of a plurality of procured product codes added to the procured products as information regarding the procured products (S11-C1). Thereafter, the PID generation unit 11 converts the received information into information in a JSON format (S11-C2), generates a PID of the procured product based on the converted information (see FIG. 9), and outputs the generated PID to a hash processing unit 12 (S12).

The hash processing unit 12 hashes the PID generated by the PID generation unit 11 using a predetermined hash function to generate a new meaningless code, and outputs the generated meaningless code to the header/parity addition unit 13. Thereafter, the header/parity addition unit 13 executes processing of steps S13 to S17 similarly to processing of steps S13 to S17 illustrated in FIG. 4.

Configuration of JSON Object 200 of Third Embodiment

Figure 9:
FIG. 9 is a diagram illustrating a JSON object that defines a PID used in the third embodiment.

FIG. 9 is a diagram illustrating a JSON object that defines the PID used in the third embodiment. In FIG. 9, the JSON object 200 includes a format 201, a procured product PID 202, and a procured product performance-based DNC 203. As a format used when the PID of the procured product is recorded, each element including "key name": "value" is recorded in the format 201. In the procured product PID 202, information when information of a plurality of procured product codes added to the procured products is converted into a JSON format is recorded. For example, "business place": "(SK) (N)", "classification code": "VVVV", "figure No. product No.": "WWWW", "official product name": "AAAA", "customer name": "customer 1", and "supplier": "supplier 1" are repeatedly recorded in the procured product PID 202. Note that, instead of the procured product code, information of a CSV file added to the procured product can also be used.

Information of the DNC generated by the header/parity addition unit 13 based on the information on the procured product PID 202 is recorded in the procured product performance-based DNC 203. Note that the information recorded in the JSON object 200 is recorded in a quality data lake 3.

Reverse Lookup Processing of Code Generation System 1 of Third Embodiment

Figure 10:
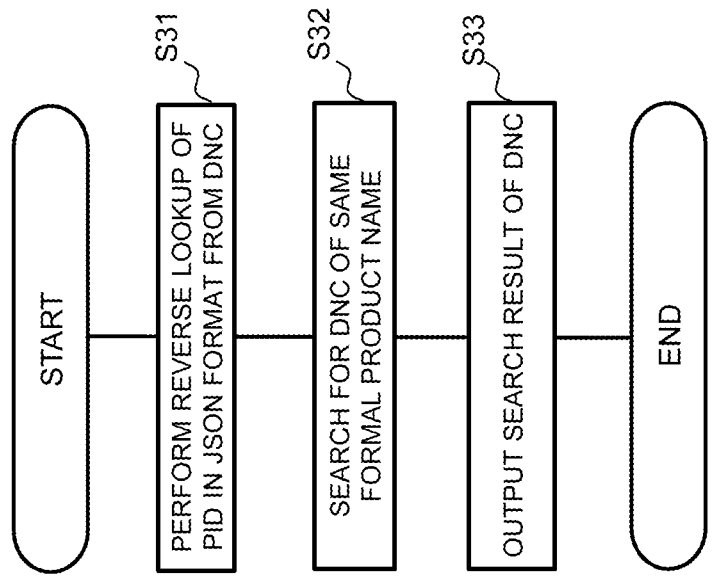
FIG. 10 is a flowchart illustrating processing of performing reverse lookup of a PID from a DNC in the third embodiment.

FIG. 10 is a flowchart illustrating processing of performing reverse lookup of a PID from a DNC in the third embodiment. In FIG. 10, when an operator instructs a terminal 30 to perform the processing of performing reverse lookup of the PID from the DNC, in response to the instruction of the operator, the terminal 30 scans a code image pasted on the procured product to read the DNC, transfers the information of the read DNC to a DB management device 40, and requests the DB management device 40 to perform the processing of performing reverse lookup of the PID from the DNC. As a result, processing in this routine is started. In response to the request from the terminal 30, the DB management device 40 performs processing of performing reverse lookup of the PID in the JSON format from the DNC of the procured product based on the information of the DNC transferred from the terminal 30 (S31). For example, the DB management device 40 refers to the information of the JSON object 200 recorded in the quality data lake 3 based on the information of the DNC transferred from the terminal 30, and searches for the DNC of the same formal product name (S32). Thereafter, the DB management device 40 outputs, for example, information of the "official product name": "AAAA" as a search result of the DNC of the same official product name among the information recorded in the JSON object 200 (S33), and ends the processing in this routine.

According to the third embodiment, a new DNC different from that of the first embodiment can be generated based on a plurality of procured product codes added to procured products, and the generated DNC can be used as the DNC of the procured product. In addition, the generated DNC can be converted into a two-dimensional code, and the DNC converted into the two-dimensional code can be pasted or printed on a procured product and stored in a factory or the like. Further, it is possible to search a history of the procured product by performing reverse lookup of the PID from the DNC of the procured product.

Fourth Embodiment

Hereinafter, a fourth embodiment of the present invention will be described with reference to FIGS. 11 to 13. Note that a configuration of an entire system S in the fourth embodiment is similar to that in the first embodiment.

Outline of Cooperation Between LCM Service System and DNC of Fourth Embodiment

Figure 11:
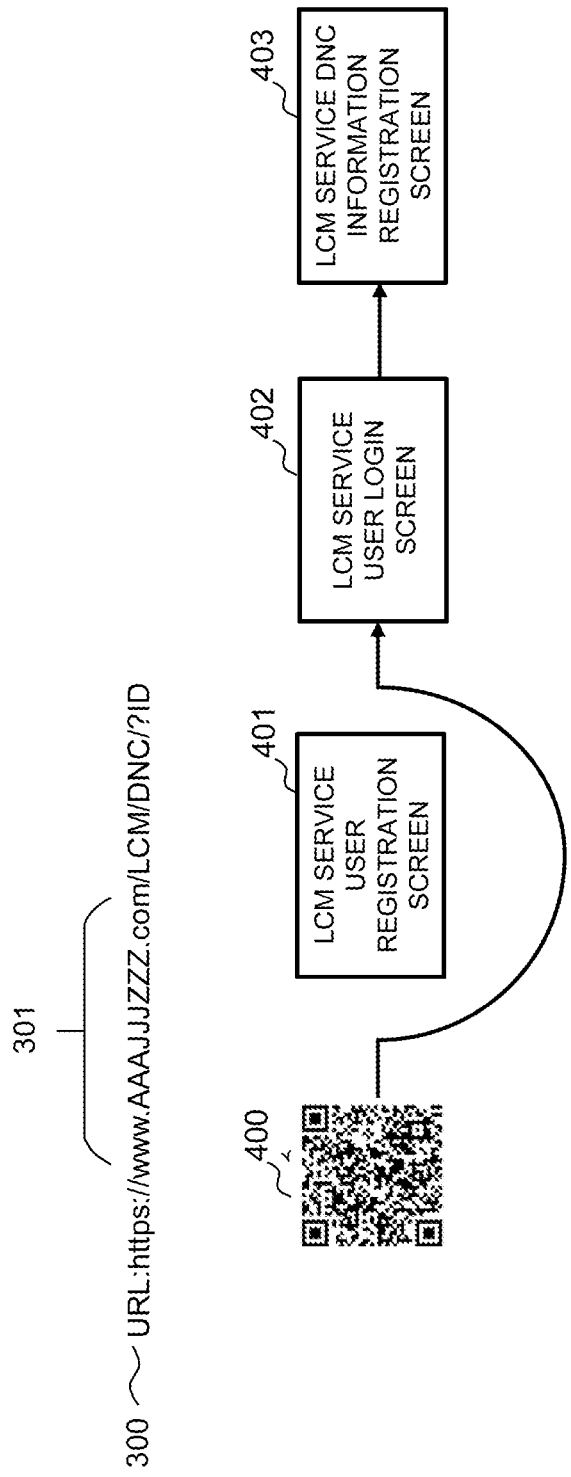
FIG. 11 is a diagram illustrating an outline of cooperation between a DNC and an LCM service system by using a code image in a fourth embodiment.

FIG. 11 is a diagram illustrating an outline of cooperation between a DNC and an LCM service system by using a code image in the fourth embodiment. In FIG. 11, in the LCM service system, when a two-dimensional code is generated from a DNC and the two-dimensional code is imaged into a code image, information having an LCM, a DNC, or the like is used in addition to a domain 301 of a life cycle management (LCM) service as a uniform resource locator (URL) 300 used when a Web browser is accessed, information of the URL 300 is converted into a two-dimensional code, the converted two-dimensional code is imaged to generate a code image 400, and the generated code image 400 is printed on a label or the like of a product. When the code image 400 is registered using a mobile terminal, the LCM service system transmits and receives information to and from the mobile terminal, displays an LCM service user registration screen 401 on the mobile terminal, and then switches the display screen of the mobile terminal to an LCM service user login screen 402. Then, after user authentication is performed using the LCM service user login screen 402, the LCM service system switches the display screen of the mobile terminal to an LCM service DNC information registration screen 403, acquires information of a product corresponding to the LCM recorded in the URL 300 from the mobile terminal, and displays the acquired information of the product on the LCM service DNC information registration screen 403.

Configuration of LCM Service System 50 of Fourth Embodiment

Figure 12:
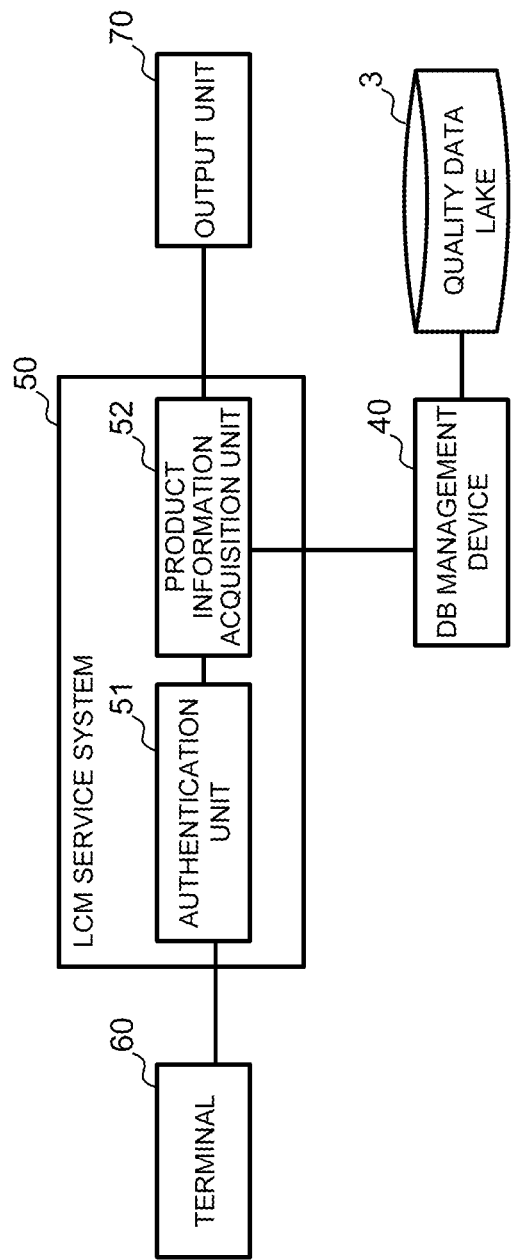
FIG. 12 is a diagram illustrating a configuration of the LCM service system according to the fourth embodiment.

FIG. 12 is a diagram illustrating a configuration of the LCM service system according to the fourth embodiment. In FIG. 4, a terminal 60 that receives input of a two-dimensional code, information regarding a product, an operator's instruction, and the like, and an output unit 70 that outputs product information acquired by an LCM service system 50 are connected to the LCM service system 50.

The LCM service system 50 has an authentication unit 51 and a product information acquisition unit 52. The authentication unit 51 fetches the code image 400 pasted on the product from the terminal 60, receives the two-dimensional code included in the code image 400, receives information regarding the user authentication from the terminal 60, executes processing of the user authentication, and outputs a processing result of the user authentication and information of the two-dimensional code to the product information acquisition unit 52. When the processing result of the user authentication is OK, the product information acquisition unit 52 identifies the two-dimensional code, acquires a DNC identified by the two-dimensional code and product information to be information of a product corresponding to the DNC based on an identification result, and outputs the acquired product information to the output unit 70 and a DB management device 40. The output unit 70 displays the product information acquired by the product information acquisition unit 52 on the LCM service DNC information registration screen 403. The DB management device 40 stores the product information acquired by the product information acquisition unit 52 and the DNC identified by the two-dimensional code in association with each other in a quality data lake 3.

Processing of LCM Service System 50 of Fourth Embodiment

Figure 13:
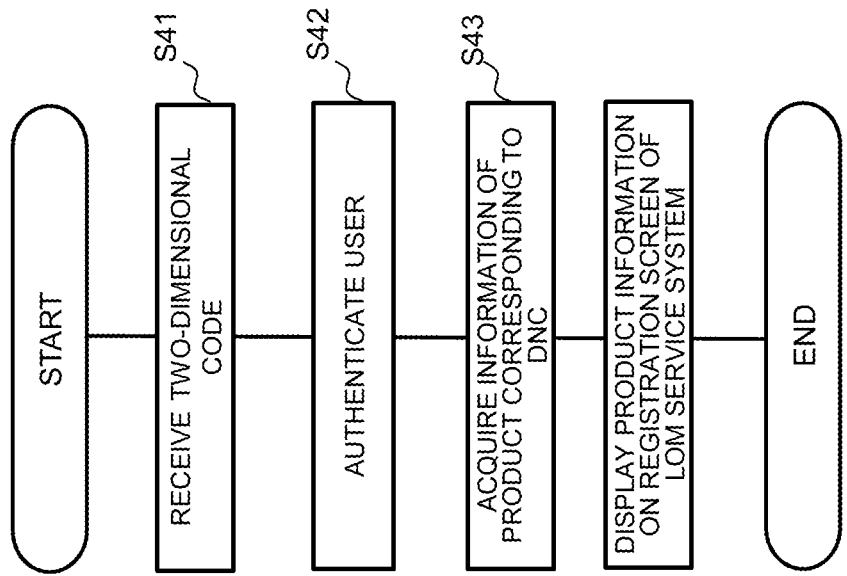
FIG. 13 is a flowchart illustrating processing of displaying a registration screen of product information based on a DNC in the fourth embodiment.

FIG. 13 is a flowchart illustrating processing of displaying the registration screen of the product information based on the DNC in the fourth embodiment. In FIG. 13, the authentication unit 51 fetches the code image 400 pasted on the product from the terminal 60, and receives the two-dimensional code included in the code image 400 (S41).

Thereafter, the authentication unit 51 receives the information regarding the user authentication from the terminal 60, executes the processing of the user authentication, and outputs a processing result of the user authentication and information of the two-dimensional code to the product information acquisition unit 52 (S42).

Next, when the processing result of the user authentication is OK, the product information acquisition unit 52 identifies the information of the two-dimensional code, acquires the DNC identified by the two-dimensional code and the production information to be the information of the product corresponding to the DNC based on an identification result, and outputs the acquired product information to the output unit 70 and the DB management device 40 (S43). Thereafter, the output unit 70 displays the product information acquired by the product information acquisition unit 52 on the LCM service DNC information registration screen 403 (S43), and ends the processing in this routine.

According to the fourth embodiment, it is possible to display the information of the product corresponding to the DNC under a condition that the user authentication is obtained.

Fifth Embodiment

Hereinafter, a fifth embodiment of the present invention will be described with reference to FIGS. 14 and 15. Note that a configuration of an entire system S in the fifth embodiment is similar to that in the first embodiment.

Figure 14:
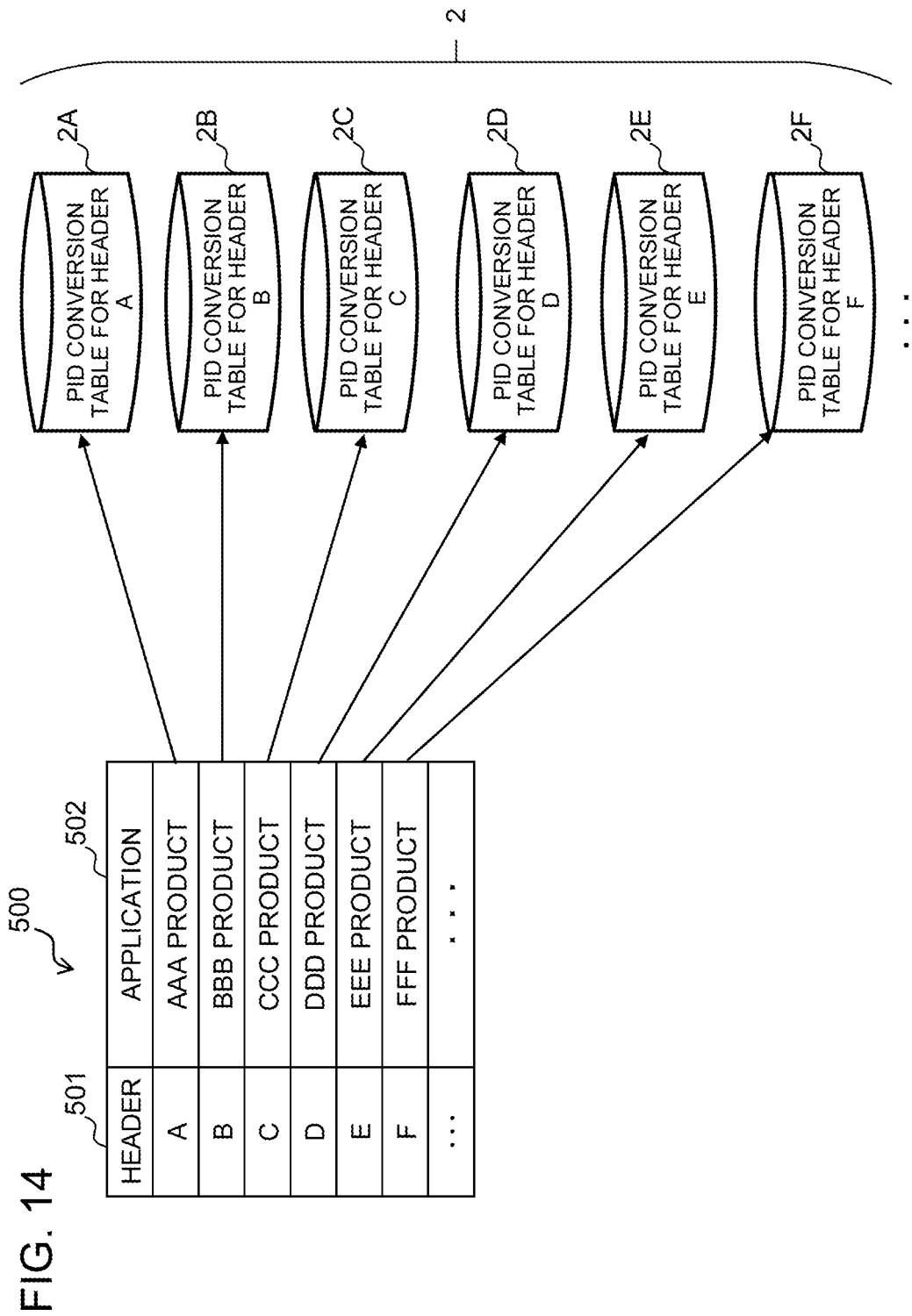
FIG. 14 is a configuration diagram illustrating configurations of a PID conversion table and a header management table according to a fifth embodiment.

Configurations of PID Conversion Table 2 and Header Management Table 500 of Fifth Embodiment FIG. 14 is a configuration diagram illustrating configurations of a PID conversion table and a header management table according to the fifth embodiment. In FIG. 14, the PID conversion table 2 includes a plurality of PID conversion tables, for example, a PID conversion table 2A for a header A, a PID conversion table 2B for a header B, a PID conversion table 2C for a header C, a PID conversion table 2D for a header D, a PID conversion table 2E for a header E, a PID conversion table 2F for a header F, and the like. At this time, the PID conversion table for each header is managed by a header management table 500.

The header management table 500 is a table stored in a header/parity addition unit 13, and includes a header 501 and an application 502. The header 501 stores an identifier that uniquely identifies a header assigned to a hash value output by a hash processing unit 12. For example, when a product is "for AAA product", "for AAA product" is stored in the application 502 as information indicating an application of the product. At this time, when the product is "for AAA product", the header 501 stores information of "A" indicating that the PID conversion table 2A for the header A is a management target as one PID conversion table of a plurality of PID conversion tables. In addition, each PID conversion table stores information of a DNC and the like corresponding to each header. For example, when the number of digits of the DNC is defined by a total amount of products, the upper limit of the total amount of products can be stored in association with each header. At this time, for example, a header "F" can be stored in association with the upper limit of the total amount: 1 billion, and a header "P" can be stored in association with the upper limit of the total amount: 1 trillion.

Processing of Code Generation System 1 of Fifth Embodiment

Figure 15:
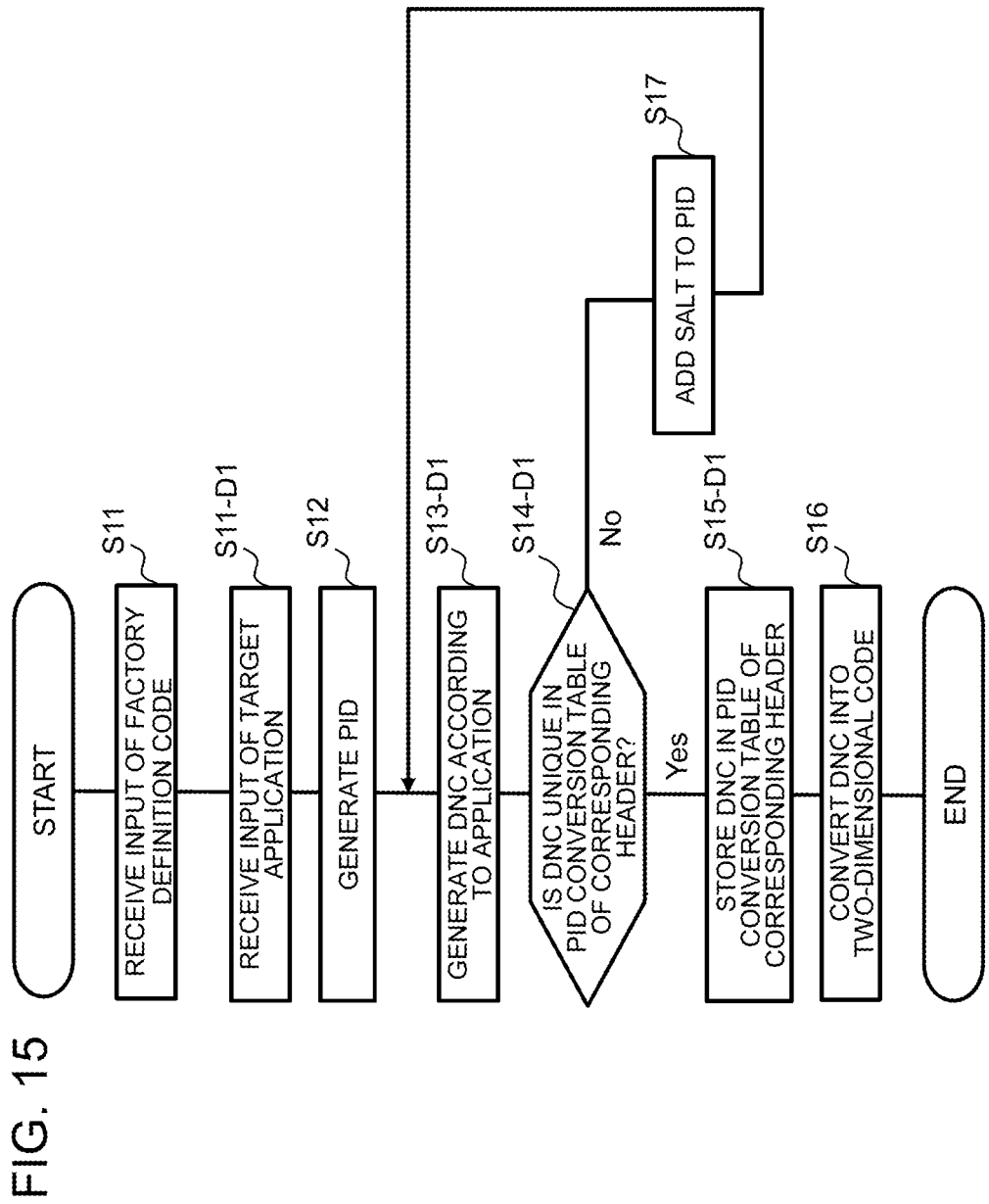
FIG. 15 is a flowchart illustrating processing of a code generation system according to the fifth embodiment.

FIG. 15 is a flowchart illustrating processing of a code generation system according to the fifth embodiment. In FIG. 15, in a code generation system 1, a PID generation unit 11 receives input of a factory definition code as information regarding a product from an input unit 10 (S11). For example, the PID generation unit 11 receives the product number=ABCD12345 as the A factory definition code. At this time, the PID generation unit 11 receives, for example, input of information regarding an application of the product as a target application (S11-D1). Thereafter, the PID generation unit 11 adds a code (factory code) for identifying the factory A to the A factory definition code to generate a PID, outputs the generated PID to the hash processing unit 12, and outputs the information regarding the application of the product to the header/parity addition unit 13 (S12).

The hash processing unit 12 hashes the PID generated by the PID generation unit 11 using a predetermined hash function to generate a new meaningless code, and outputs the generated meaningless code to the header/parity addition unit 13. As the hash function, a cryptographic hash function is used. The cryptographic hash function refers to a method capable of generating a statistically unbiased hash value with characteristics of the first development difficulty and the second development difficulty of a generated hash value.

As an example, a hash function known as SHA256 which is one of the SHA2 groups will be described. This hash function generates a 256-bit hash value, but a 256-bit space has a huge space of $2^{256}=1.2\times10^{77}$. When this space is considered as an address space, one address is designated by a 256-bit address. Address information is a number indicating a part or a product that is meaninglessly coded. When a 256-bit binary number is expressed by characters, the number of characters is 256 in binary notation of 0 and 1, 64 in hexadecimal notation known as hexadecimals, and 43 in expression by BASE64 encoding used when binary data is expressed by characters in an e-mail. A total number of parts or products that can be designated by this is $1.2\times10^{77}$ at the maximum, but when such a total number is unnecessary, the number of bits may be reduced. In the case of the cryptographic hash function, since there is no statistical deviation in the generated hash value, it is possible to adopt a necessary and sufficient number of bits of the generated hash value and discard (truncate) the hash value thereafter. If description is given using the example of SHA256, for example, 40 bits ($2^{40}=1.1\times10^{12}$) are sufficient if the total number of parts or products that can be designated is about 1 trillion at the maximum. Therefore, 40 bits of the generated 256-bit hash value may be used and the remaining 216 bits may be discarded. When a value of 40 bits is expressed by characters, the number of characters is 40 in binary notation, 10 in hexadecimal notation, and 7 in BASE64. When the number for representing the part or the product is shorter, handling is easier and when the total amount that can be represented is larger, reliability is higher. That is, there is a trade-off relation. In the present invention, in order to use a number most efficiently, a meaningless code is used without a field structure of designating anything from what digit to what digit. The meaningless code is given to the next header/parity addition unit.

The header/parity addition unit 13 refers to the header management table 500 based on the information regarding the application of the product, selects a header according to the application of the product, and generates a DNC obtained by adding the selected header and parity to the meaningless code generated by the hash processing unit 12 as a DNC according to the application of the product (S13-D1). Thereafter, the header/parity addition unit 13 refers to the PID conversion table 2 identified by the generated DNC. For example, when the DNC is generated based on the header "A", the header/parity addition unit 13 refers to the PID conversion table 2A for the header A, compares the generated DNC with the existing DNC recorded in the PID conversion table 2A for the header A, and determines whether or not the generated DNC is unique in the corresponding PID conversion table 2A for the header A (S14-D1).

When an affirmative determination result is obtained in step S14-D1, that is, when the generated DNC is not matched with the existing DNC and is unique in the corresponding PID conversion table 2A for the header A, the header/parity addition unit 13 executes processing of storing the generated DNC in the PID conversion table 2A for the header A (S15-D1). For example, the header/parity addition unit 13 generates a record 2L in which the PID generated in step S12 and the DNC generated in step S13-D1 have been associated with each other, and records the generated record 2L in the PID conversion table 2A for the header A.

Thereafter, the header/parity addition unit 13 converts the DNC generated in step S13-D1 into a two-dimensional code, generates a code image based on the two-dimensional code, and ends the processing in this routine.

On the other hand, when a negative determination result is obtained in step S14-D1, that is, when the generated DNC is matched with the existing DNC and hashing collision occurs, the code generation system 1 adds salt (an addition code of a predetermined number of bits for changing the output hash value) to the PID generated in step S12 (S17), and proceeds to the processing of step S13-D1. At this time, in step S13, the header/parity addition unit 13 generates a new DNC as a DNC according to the application of the product based on the value obtained by adding the salt to the PID generated in step S12. Thereafter, the header/parity addition unit 13 executes the processing of steps S14-D1 to S17.

At this time, the PID conversion tables 2A to 2F for the respective headers can be configured as a plurality of application-specific management tables in which the DNC is divided into a plurality of groups and recorded according to the application of the product, and the header management table 500 can be configured as a header management table in which each of the plurality of headers (A to F) corresponding to the application of the product is recorded in association with each of the plurality of application-specific management tables 2A to 2F. Further, when the information indicating the application of the product is received, the header/parity addition unit 13 can refer to the header management table 500 based on the received information indicating the application of the product to identify the header corresponding to the application of the product from among the plurality of headers, identify the application-specific management table corresponding to the application of the product from among the plurality of application-specific management tables (the PID conversion tables 2A to 2F for the headers), generate a DNC based on the identified header, and record the generated DNC in the identified application-specific management table. If a single DNC code system is acceptable, the header can be omitted. In this case, the DNC can be shortened by the number of characters of the header. In addition, if the parity check is unnecessary, the DNC can be shortened by the number of characters added as the parity (that is, the check code). In this case, the error check in the DNC alone cannot be performed, but it is possible to check whether or not the DNC is correctly read by using an error check function incorporated as a function of the two-dimensional code when the DNC is encoded into the two-dimensional code.

According to the fifth embodiment, the DNC is generated according to the application of the product, and the generated DNC can be managed by the PID conversion table that stores the DNC according to the application of the product.

Detection of Record Rewriting and Verification of Original Record

Detection of record rewriting and verification of record before rewriting will be described using FIGS. 1 and 2. As described above, the hash function outputs the hash value of the same number of digits determined regardless of whether the input value (=PID) is short or long. If the PID is different even a little, the output hash value is completely different. In the PID conversion table 2, the DNC and the PID from which the DNC is generated are described in 1:1. Rewriting of the record can be verified using this conversion table.

The products manufactured in the factory become final products by combining procured parts and internally manufactured parts. By repeating the procedure of referring to the PID from the DNC of the final product and referring to the PID from the DNC (one or more DNCs) of the parts constituting the PID, tracing back to a procured part level is enabled. This is because it is very useful as a function of the quality data lake, and when a defect occurs in a product, it is possible to narrow down an influence range by tracing back to a part level and take a countermeasure. In order to effectively maintain such a traceback mechanism, consistency of the record is important. Therefore, it is necessary to rewrite the corresponding portion of the quality data lake 3 or the PID conversion table 2 in order to maintain consistency regardless of whether the rewriting is performed in good will like correction of an error or the rewriting is performed intentionally including maliciousness.

Then, for example, in a case where the PID description is described up to the assembly record using the JSON format document, it is especially easy to understand the PID, but all the description items become input of the hash function as the PID. For this reason, if rewriting is performed even a little to maintain consistency, the generated hash value is completely different from the DNC recorded in the PID conversion table 2, and the rewriting of the record can be easily detected. The same hash value as the currently recorded DNC is not the same as the PID that is the source of the conversion unless it is completely the same. For this reason, if the PID before rewriting can be estimated, it is possible to accurately verify whether or not the estimation is correct using the code generation system 1.

Configuration of Hardware of Computer

Figure 16:
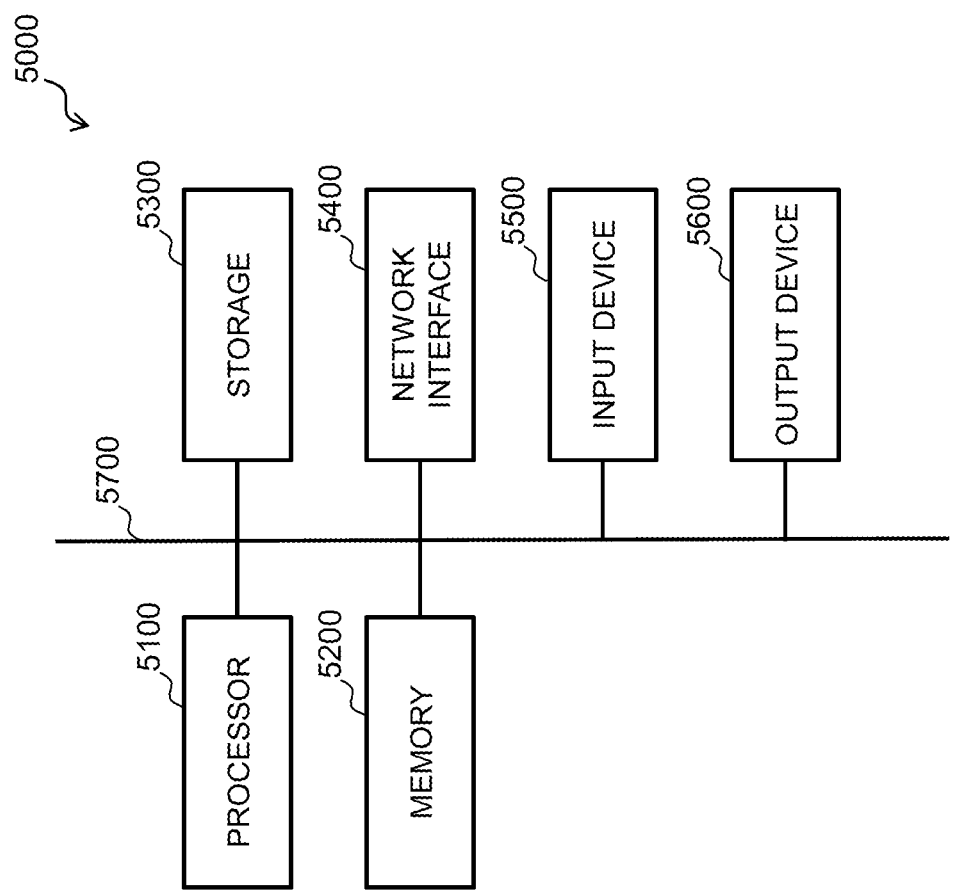
FIG. 16 is a configuration diagram of hardware of a computer that implements each system.

FIG. 16 is a configuration diagram of hardware of a computer that realizes each system. In FIG. 16, a system 5000 constituting the code generation system 1 or the industrial system 200 includes, for example, a computer device (computer) including a processor 5100, a memory 5200, a storage 5300, a network interface 5400, an input device 5500, and an output device 5600, and the respective units are connected via a bus 5700.

The processor 5100 includes, for example, a central processing unit (CPU) that comprehensively controls the operation of the entire device. The memory 5200 includes storage media such as a random access memory (RAM) and a read only memory (ROM). The storage 5300 includes, for example, a storage apparatus including a storage device such as a hard disk device, a semiconductor memory device, an optical disk device, a magneto-optical disk device, a magnetic tape device, or a flexible disk device. The network interface 5400 includes a network interface card (NIC) for connection to a wireless LAN or a wired LAN. The input device 5500 includes a keyboard or a mouse, and the output device 5600 includes a display or a printer.

The storage 5300 stores various computer programs read into the memory 5200 by the processor 5100 and executed. For example, the storage 5300 stores a PID generation program that causes the processor 5100 to function as the PID generation unit 11, a hash processing program that causes the processor 5100 to function as the hash processing unit 12, a header/parity addition program that causes the processor 5100 to function as the header/parity addition unit 13, an authentication program that causes the processor 5100 to function as the authentication unit 51, and a product information acquisition program that causes the processor 5100 to function as the product information acquisition unit 52. In addition, the storage 5300 may be configured as a storage unit that stores various types of information or data, and information of the PID conversion table 2, the PID conversion table 2A for the header A to the PID conversion table 2F for the header F, the quality data lake 3, and the header management table 500 may be stored in the storage unit.

Note that the present invention is not limited to the above-described embodiments, and includes various modifications. For example, the PID conversion table 2 and the quality data lake 3 may be configured as an integrated database, and the information of the PID conversion table 2 and the quality data lake 3 may be stored in the integrated database. Further, the DB management device 40 may be configured as a search unit, and a function of the search unit may be added to the code generation system 1 or the LCM service system 50. The above-described embodiments have been described in detail in order to describe the present invention in an easy-to-understand manner, and are not necessarily limited to those having all the described configurations. In addition, a part of a configuration of a certain embodiment can be replaced with a configuration of another embodiment, and the configuration of another embodiment can be added to the configuration of the certain embodiment. In addition, it is possible to add, remove, replace, integrate, and distribute other configurations for a part of the configuration of each embodiment. In addition, each processing described in the embodiments may be appropriately distributed or integrated based on processing efficiency or mounting efficiency.

In addition, some or all of the above-described configurations, functions, processing units, processing mechanisms, and the like may be realized by hardware, for example, by designing with an integrated circuit. In addition, each of the above-described configurations, functions, and the like may be realized by software by a processor interpreting and executing a program for realizing each function. Information such as a program, a table, and a file for realizing each function can be recorded in a recording device such as a memory, a hard disk, and a solid state drive (SSD), or a recording medium such as an integrated circuit (IC) card, a secure digital (SD) memory card, or a digital versatile disc (DVD).

REFERENCE SIGNS LIST

1 Code generation system
2 PID conversion table
3 Quality data lake
10 Input unit
11 PID generation unit
12 Hash processing unit
13 Header/parity addition unit
30 Terminal
40 DB management device
50 LCM service system
51 Authentication unit
52 Product information acquisition unit
60 Terminal
70 Output unit

The invention claimed is:

1. A code generation system comprising: an identification code generation unit that generates, from information of a management target code including a first code that identifies a management target and a second code that identifies an entity which manages the management target, an identification code that identifies the management target; a hash processing unit that hashes the identification code generated by the identification code generation unit according to a hash function and converts the hashed identification code into a meaningless code; and a reference code generation unit that generates based on the meaningless code converted by the hash processing unit, a reference code for referring to the identification code.

2. The code generation system according to claim 1, wherein
the reference code generation unit generates the reference code by adding a management code including a header and a parity to the meaningless code converted by the hash processing unit.

3. The code generation system according to claim 2, further comprising:
a storage unit that stores a management table as a storage destination of the reference code, wherein
when the reference code is generated, the reference code generation unit compares the generated reference code with an existing reference code recorded in the management table, and records the identification code generated by the identification code generation unit and the generated reference code in association with each other in the management table, under a condition that the generated reference code does not exist in the management table.

4. The code generation system according to claim 3, wherein
when the generated reference code exists in the management table, the reference code generation unit adds a correction value to the identification code generated by the identification code generation unit to generate a new reference code, and records the identification code generated by the identification code generation unit and the generated new reference code in association with each other in the management table, under a condition that the generated new reference code does not exist in the management table.

5. The code generation system according to claim 2, wherein
the reference code generation unit converts the generated reference code into a two-dimensional code, and generates a code image based on the converted two-dimensional code.

6. The code generation system according to claim 2, further comprising:
a storage unit that stores a plurality of application-specific management tables that record the reference code while dividing the reference code into a plurality of groups according to an application of the management target, and a header management table that records each of a plurality of headers corresponding to the application of the management target in association with each of the plurality of application-specific management tables, wherein
when information indicating the application of the management target is received, the reference code generation unit identifies a header corresponding to the application of the management target from among the plurality of headers by referring to the header management table based on the received information indicating the application of the management target, identifies an application-specific management table corresponding to the application of the management target from among the plurality of application-specific management tables, generates the reference code based on the identified header, and records the generated reference code in the identified application-specific management table.

7. The code generation system according to claim 3, further comprising:

a search unit that transmits and receives information to and from a terminal and searches the storage unit as a search destination, wherein
when a search request including the reference code is received from the terminal, the search unit searches the storage unit in response to the search request, extracts information of the identification code corresponding to the reference code added to the search request from the management table, and transmits the extracted information of the identification code to the terminal.

8. The code generation system according to claim 1, wherein
the management target includes a product, a part, or a procured product, and
when the management target is the product, the management target code is a product number of the product and a factory code of a factory that has manufactured the product, when the management target is the part, the management target code is a manufacturing number of the part and a factory code of a factory that has manufactured the part, and when the management target is the procured product, the management target code is a procured product number that identifies the procured product and a factory code of a factory that has procured the procured product.

9. A code generation method comprising:
an identification code generation step of generating, from information of a management target code including a first code that identifies a management target and a second code that identifies an entity which manages the management target, an identification code that identifies the management target; a hashing step of hashing the identification code generated by the identification code generation step according to a hash function and converting the hashed identification code into a meaningless code; and a reference code generation step of generating based on the meaningless code converted by the hash processing unit, a reference code for referring to the identification code.

10. The code generation method according to claim 9, wherein
the reference code generation step generates the reference code by adding a management code including a header and a parity to the meaningless code converted by the hashing step.

11. The code generation method according to claim 10, further comprising:
a storage step of storing a management table as a storage destination of the reference code, wherein
when the reference code is generated, the reference code generation step compares the generated reference code with an existing reference code recorded in the management table, and records the identification code generated by the identification code generation step and the generated reference code in association with each other in the management table, under a condition that the generated reference code does not exist in the management table.

12. The code generation method according to claim 11, wherein
when the generated reference code exists in the management table, the reference code generation step adds a correction value to the identification code generated by the identification code generation step to generate a new reference code, and records the identification code generated by the identification code generation step and the generated new reference code in association with each other in the management table, under a condition that the generated new reference code does not exist in the management table.

13. The code generation method according to claim 10, wherein
the reference code generation step converts the generated reference code into a two-dimensional code, and generates a code image based on the converted two-dimensional code.

14. The code generation method according to claim 10, further comprising:
a storage step of storing a plurality of application-specific management tables that record the reference code while dividing the reference code into a plurality of groups according to an application of the management target, and a header management table that records each of a plurality of headers corresponding to the application of the management target in association with each of the plurality of application-specific management tables, wherein
when information indicating the application of the management target is received, the reference code generation step identifies a header corresponding to the application of the management target from among the plurality of headers by referring to the header management table based on the received information indicating the application of the management target, identifies an application-specific management table corresponding to the application of the management target from among the plurality of application-specific management tables, generates the reference code based on the identified header, and records the generated reference code in the identified application-specific management table.

15. The code generation method according to claim 11, further comprising:
a search step of transmitting and receiving information to and from a terminal and searching the management table stored by the storage step as a search destination, wherein
when a search request including the reference code is received from the terminal, the search step searches the management table in response to the search request, extracts information of the identification code corresponding to the reference code added to the search request from the management table, and transmits the extracted information of the identification code to the terminal.

16. The code generation system according to claim 1, wherein the management target is in an industry segment.

17. The code generation system according to claim 1, wherein the information of the management target code is information of industry segment code.

18. The method according to claim 9, wherein the management target is in an industry segment.

19. The method system according to claim 9, wherein the information of the management target code is information of industry segment code.

* * * * *